United States Patent
Stewart et al.

(10) Patent No.: US 7,805,069 B2
(45) Date of Patent: Sep. 28, 2010

(54) IMAGING DEVICE, SYSTEM AND ASSOCIATED METHODS USING MULTIPLE HARMONIZED DATA STREAMS

(75) Inventors: Brian Stewart, Lothian (GB); Andrew Hodgson, Lothian (GB)

(73) Assignee: STMicroelectronics (Research and Development) Limited, Marlow-Buckinghamshire (GB)

( * ) Notice: Subject to any disclaimer, the term of this patent is extended or adjusted under 35 U.S.C. 154(b) by 714 days.

(21) Appl. No.: 11/482,659

(22) Filed: Jul. 7, 2006

(65) Prior Publication Data

US 2007/0009256 A1    Jan. 11, 2007

(30) Foreign Application Priority Data

Jul. 8, 2005    (EP) .................................. 05106272

(51) Int. Cl.
  *G03B 17/48*    (2006.01)
  *H04N 5/225*    (2006.01)
(52) U.S. Cl. ..................................... 396/429; 348/207.1
(58) Field of Classification Search .................. 396/57, 396/429; 348/207.1, 222.1
See application file for complete search history.

(56) References Cited

U.S. PATENT DOCUMENTS

| | | | |
|---|---|---|---|
| 2002/0033970 A1 | 3/2002 | Chen | 358/445 |
| 2002/0171743 A1 | 11/2002 | Kimizuka et al. | 348/222.1 |
| 2004/0075745 A1* | 4/2004 | Mance et al. | 348/207.1 |
| 2006/0227217 A1* | 10/2006 | Satoh et al. | 348/207.99 |
| 2006/0237427 A1* | 10/2006 | Logan | 219/401 |
| 2007/0147677 A1* | 6/2007 | Matsushita et al. | 382/159 |
| 2007/0274291 A1* | 11/2007 | Diomelli | 370/352 |
| 2008/0007635 A1* | 1/2008 | Hsu et al. | 348/247 |

FOREIGN PATENT DOCUMENTS

| | | |
|---|---|---|
| EP | 0 881 821 | 12/1998 |
| EP | 1 143 694 | 10/2001 |
| GB | 2 255 613 | 11/1992 |
| WO | 02/063451 | 8/2002 |
| WO | 2004/025652 | 3/2004 |

* cited by examiner

*Primary Examiner*—Rodney E Fuller
(74) *Attorney, Agent, or Firm*—Lisa K. Jorgenson; Allen, Dyer, Doppelt, Milbrath & Gilchrist, P.A.

(57) ABSTRACT

An imaging system includes an image sensor, a digital image sensing device and a host system. The digital image sensing device provides image data in a plurality of formats, suitable for the differing requirements of different applications running on a host system.

16 Claims, 2 Drawing Sheets

IMAGING DEVICE, SYSTEM AND ASSOCIATED METHODS USING MULTIPLE HARMONIZED DATA STREAMS

FIELD OF THE INVENTION

The present invention relates to multiple harmonized data stream technology. In particular, the invention relates to data streams used in imaging and video applications.

BACKGROUND OF THE INVENTION

An image sensor is typically made to be incorporated within a digital image sensing device, and such digital image sensing devices can then furthermore be arranged to operate in conjunction with a host system. A "digital image sensing device" is defined as any image sensing device that provides a digital representation of a scene or an image. In such a case, the host system can be running one or more applications which receive, interpret and perform operations on the image data obtained from the digital image sensing device.

The raw image data gathered by a pixel array of the image sensor is post-processed by circuitry of the image sensor and/or the image sensing device, for example to be pleasing to the human eye, or to compress the data for storage. The type of post-processing that is applied depends on the type of digital image sensing device within which the image sensor is incorporated. Thus, at present, a digital image sensing device can only supply image data in a single format at any one time.

In the case where a digital image sensing device is only used for a single purpose, the image sensing device is customized to transmit image data in the single format which is optimal for post-processing by a particular application on the host system. However, in the case where the host system can run more than one type of application, either simultaneously or individually, the supply of image data in only a single format may prove problematic. While the image data may be in a format that is ideal for a first application, the performance of the other applications or processing tasks that are running or that can run on the host system may be detrimentally affected by the post-processing.

Each specific application can include an extra processing step to filter or otherwise manipulate the image data obtained. However, this increases the processing power required by the host system to run the applications, and also raises issues of interoperability between different image processing devices and different applications.

SUMMARY OF THE INVENTION

According to a first aspect of the present invention there is provided a digital image sensing device comprising an image sensor and a processing unit or means arranged to extract image data from the image sensor in a plurality of different data formats for subsequent transmission. Preferably, the processing means comprises means for transmission of each data format in a specific data channel.

According to further aspects, a webcam and a digital still camera (DSC) are provided which include the digital image sensing device. The invention also provides for an imaging system comprising the digital image sensing device together with a host system. The host system can for example be a personal computer (PC) or a mobile baseband.

According to a second aspect of the present invention, there is provided a method of processing multiple image data streams, comprising the steps of obtaining image data with an image sensor, processing the image data in a digital image sensing device, and simultaneously transmitting the processed data to a host system in a plurality of different formats.

Preferably, the step of processing the image data in a digital image sensing device comprises the step of preparing each different data format for transmission in a particular data channel. Preferably, each data transmission channel is used to transmit data in a format and according to a communication protocol suitable for processing by a specific application on a receiving system.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

The present invention involves the transmission of multiple versions of image data from a digital image sensing device to improve, accelerate or otherwise aid the end-use task of a host system. The transmission of multiple versions of an image can therefore match, or harmonize with, the processing or display requirements of the application or applications running on the host system.

In the field of digital image sensing devices, most webcams and digital still camera interfaces have used the USB1.1 standard for connecting devices. However, the newer USB2 standard offers 40 times the bandwidth of USB1.1. The bandwidth available in USB1.1 had meant that a single transmission of data was only just possible at a framerate high enough for image processing. Indeed, JPEG compression was often necessary on this single channel of data just to achieve transfer at 15 or 30 frames per second. The transmission of multiple versions of the data is enabled by the greater bandwidth of USB2. Similarly, LAN, Bluetooth and wireless versions thereof now provide suitable bandwidth for the transmission of image data.

Figure 1:
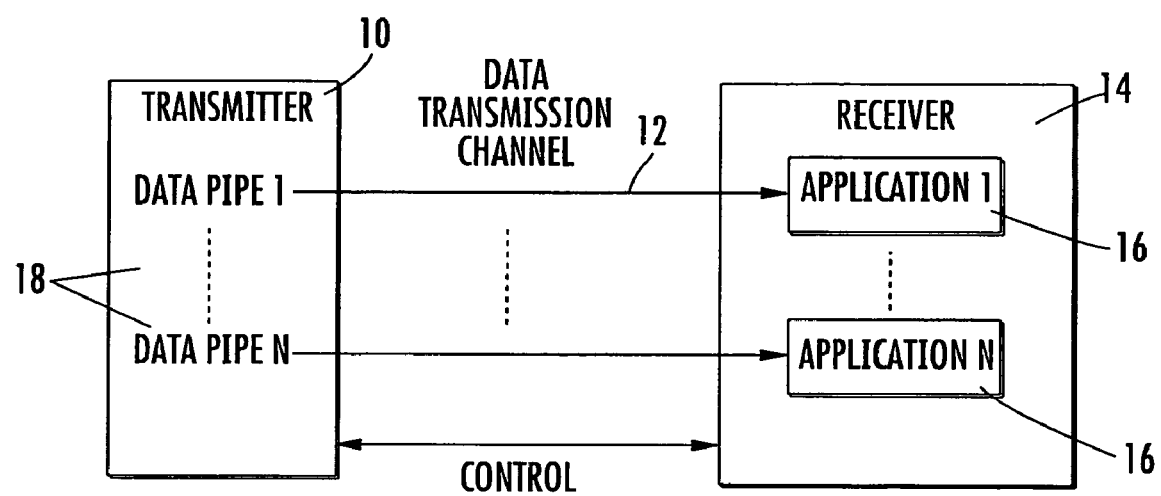
FIG. 1 is a schematic diagram showing a first embodiment of the invention.

The invention is illustrated in FIG. 1. A digital image sensing device (incorporating an image sensor) is illustrated as a data transmitter 10 which sends information via a data transmission channel 12 to the host system, illustrated as a data receiving system 14. The receiving system 14 has a plurality of applications 16, and the input for each application 16 is provided by a data channel 18 which provides data in a format suitable for that application 16. One data channel 18 can provide the input to more than one application 16, or each application can have its own dedicated data channel 18.

The data transmitter 10 can for example be a digital still camera or a web camera. The transmission channel 12 can for example be a wireless or physical USB2, wireless of physical LAN, or Bluetooth connection. The data receiving system 14 can for example be a host PC or a mobile base band. It is also to be appreciated that the data receiving system 14 may comprise a plurality of different receivers, optionally at different locations. In particular, a wireless LAN transmission channel could activate a number of different receivers, each one being activated by the data in the format that it requires for its particular processing task. Each data channel 18 can for example be an alternate color format, or a compressed version of the image data, or a pre-processed form of the image (for example, including edge information).

This principle can be embodied in various ways. For example, a web camera system could provide one data stream for direct display, another data stream for compressed capture, and perhaps a third for transmission over RTP. Because the image data is already supplied in a format suitable for use by the end-use applications, the processing overhead required by the end-use applications is reduced. This saves in the processing power that the host system needs to use, and also avoids any deterioration of image quality that results from the further processing of the image data by the end-use applications.

In other exemplary implementations, a Digital Still Camera could output a VGA JPEG format for storage on a first data channel, and a QVGA YUV422 for preview on a second data channel; or a Web Camera could output QVGA RGB24 format on a first data channel for video display and VGA Bayer CFA on a second data channel for high quality stills processing on the host system.

Similarly, a value added web camera which specializes in head tracking could output QVGA RGB24 for display on a first data channel, and VGA CFA for a head tracking application on a second data channel for detection of motion and flesh tone, and a VGA pre-processed compressed edge information for head detection on a third data channel; or a web camera for video conferencing could output VGA compressed for video capture on a first data channel, VGA YUV422 for preview display on a second data channel, and QVGA compressed RGB for RTP on a third data channel.

Figure 2:
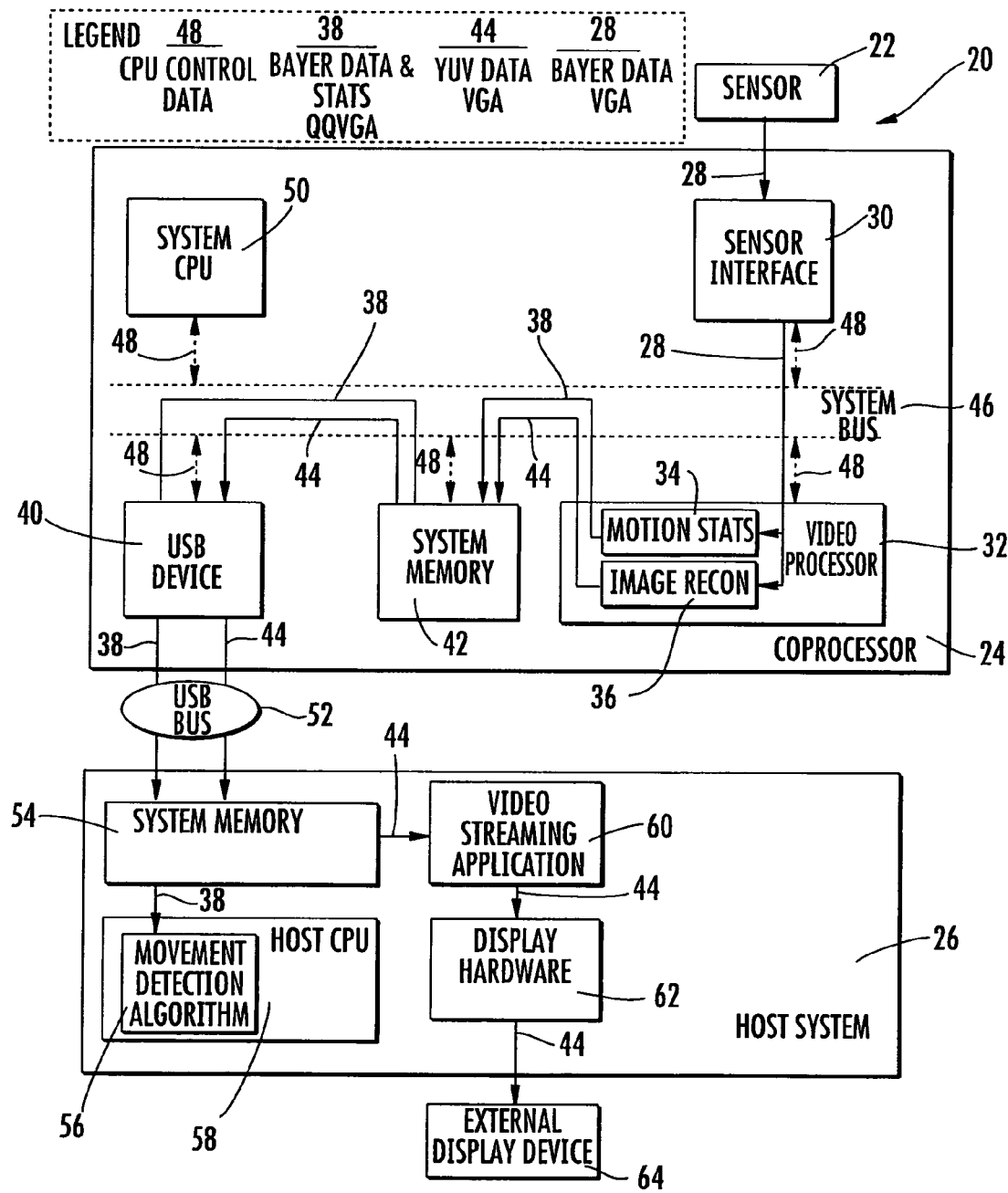
FIG. 2 is a schematic diagram showing a second embodiment of the invention.

A further specific embodiment is illustrated in FIG. 2. A digital image sensing device 20 comprises an image sensor 22 and coprocessor 24, which supplies multiple harmonized data streams to a host system 26. The image sensor 22 and the coprocesssor 24 are illustrated in FIG. 2 as two logically distinct units. However, it is to be appreciated that this is not necessarily descriptive of the physical embodiments of these components. The image sensor 22 and coprocessor 24 could be realized together in a single device, or could be physically separate.

Each data stream is tailored to the specific requirements of the applications on the host, namely movement detection and video streaming for this example. The movement detection data stream is a Bayer data stream of reduced image size that contains only the required data and statistics from the imaging system to implement movement detection on the host, while the video streaming data stream is a fully colorized and reconstructed image stream in the format of YUV video data.

Within the coprocessor 24, VGA Bayer image data 28 is received at the sensor interface 30 and passed to a video processor 32 which comprises a first module 34 for extracting motion statistics and a second module 36 for performing image reconstruction. The first module 34 passes Bayer data and statistics 38 in QVGA format to the USB device 40 via the system memory 42, and the second module 36 passes YUV data 44 in VGA format to the USB device 40 via the system memory 42. The system is controlled by CPU 50 and system bus 46. CPU control data 48 is also shown.

The USB device 40 then transmits the data 38, 44 via a USB bus 52 to the host system 26. Within the host system 26, the data 38, 44 is input to a system memory 54, and the Bayer data and statistics 38 are then processed by a movement detection process or algorithm 56 run in the host CPU 58, while the YUV data 44 are processed by a video streaming application 60 which then interfaces with display hardware 62 and an external display device 64.

Also, a feedback loop (not shown) can be provided between the host CPU 58 to the coprocessor 24 and ultimately to the sensor 22 itself, such that the results of host CPU 58 processing of the data may lead to modification in the control of the sensor 22 and/or the coprocessor 24. The feedback loop may also optionally include feedback from the coprocessor's system CPU 50 or video processor 32 or sensor interface 30. This implementation benefits the host system 26 as only the data that is required for specific tasks (movement detection and video display) is transmitted from the digital image sensing device 20 to the host 26, and the host 26 receives data tailored to each individual application.

Various improvements and modifications can be made to the above without departing from the scope of the present invention.

That which is claimed is:

1. A digital image sensing device configured for use with a host system configured to run multiple image data applications, and comprising:
   an image sensor; and
   a processor arranged to extract image data from the image sensor in a plurality of different data formats for subsequent transmission to the host system over respective data channels at a same time and each corresponding to at least one of the multiple image data applications.

2. The digital image sensing device of claim 1, wherein the processor comprises a transmission unit to transmit each data format over the respective data channel.

3. An electronic device comprising:
   a host processing unit configured to run multiple image data applications; and
   a digital image sensing device including
      an image sensor, and
      a processor arranged to extract image data from the image sensor in a plurality of different data formats for subsequent transmission to the host processing unit over respective data channels at a same time and each corresponding to at least one of the multiple image data applications.

4. The electronic device of claim 3, wherein the processor comprises a transmission unit to transmit each data format over the respective data channel.

5. The electronic device of claim 3 wherein the electronic device is a webcam.

6. The electronic device of claim 3 wherein the electronic device is a digital still camera.

7. The electronic device of claim 3 wherein the electronic device is an imaging system and associated host system.

8. The electronic device of claim 7 wherein the host system is a personal computer (PC).

9. The electronic device of claim 7 wherein the host system is a mobile baseband device.

10. A method of processing multiple image data streams for use with multiple image data applications, the method comprising:
    obtaining image data with an image sensor; and
    processing the image data in a digital image sensing device, and simultaneously transmitting the processed data to a host system in a plurality of different data formats over respective data channels each corresponding to at least one of the multiple image data applications.

11. The method of claim 10, wherein processing the image data in a digital image sensing device comprises preparing each different data format for transmission over the respective data channel.

12. The method of claim 11, wherein each data transmission channel is used to transmit data in a format and according to a communication protocol for processing by at least one of image data applications at the host system.

13. The method of claim 10 wherein the host system is a personal computer (PC).

14. The method of claim 10 wherein the host system is a mobile baseband device.

15. The method of claim 10, wherein processing the image data in a digital image sensing device comprises processing the image data in a webcam.

16. The method of claim 10, wherein processing the image data in a digital image sensing device comprises processing the image data in a digital still camera.

* * * * *

UNITED STATES PATENT AND TRADEMARK OFFICE
CERTIFICATE OF CORRECTION

| | | |
|---|---|---|
| PATENT NO. | : 7,805,069 B2 | Page 1 of 1 |
| APPLICATION NO. | : 11/482659 | |
| DATED | : September 28, 2010 | |
| INVENTOR(S) | : Stewart et al. | |

It is certified that error appears in the above-identified patent and that said Letters Patent is hereby corrected as shown below:

Column 4, Lines 64    Delete: "of"
                      Insert: -- of the --

Signed and Sealed this
Twentieth Day of March, 2012

David J. Kappos
*Director of the United States Patent and Trademark Office*